3,512,295
FISHING LURE HOLDER
Olin E. La Barge, Pontiac, Mich., assignor to La Burne Company, Pontiac, Mich., a corporation of Michigan
Filed Dec. 20, 1967, Ser. No. 692,112
Int. Cl. A01k 97/06
U.S. Cl. 43—57.5                      8 Claims

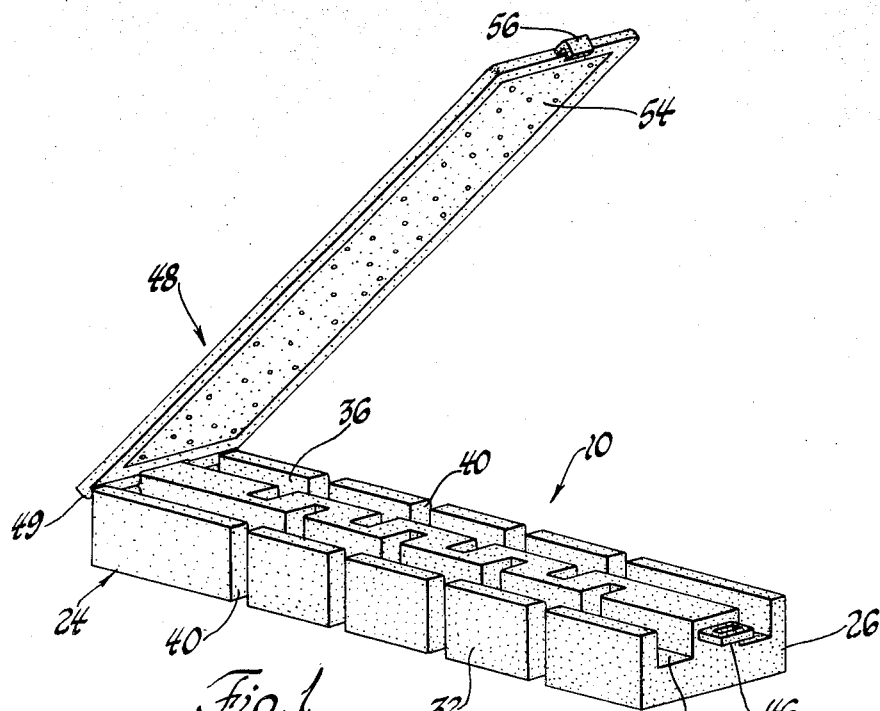
Fig. 1
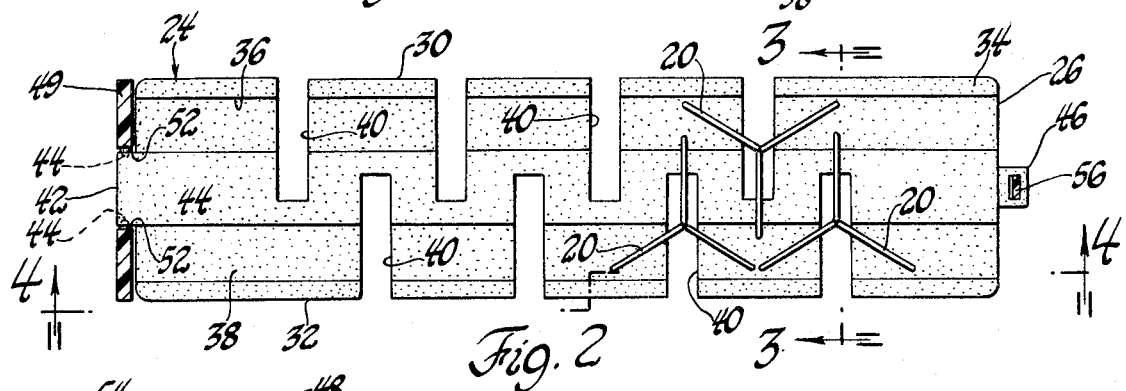
Fig. 2
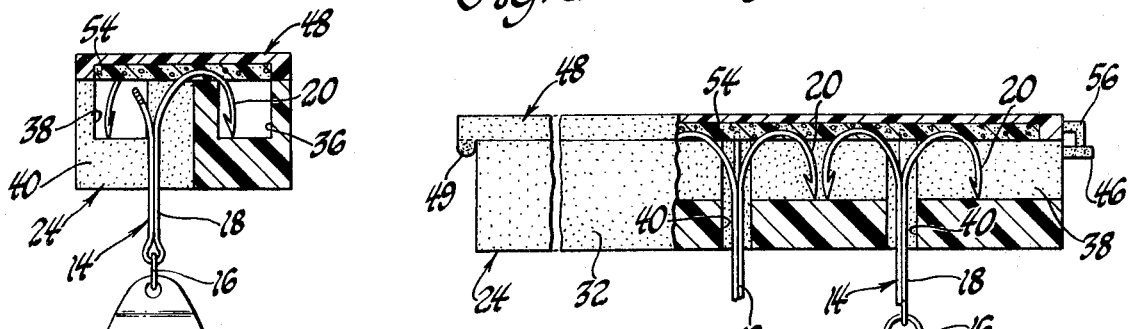
Fig. 3
Fig. 4
INVENTOR.
Olin E. LaBarge
BY George A. Schmidt
ATTORNEY United States Patent Office 3,512,295
Patented May 19, 1970

ABSTRACT OF THE DISCLOSURE

There is provided an improvement in fishing lure holders of the type adapted to receive and retain a plurality of fishing lures having one or more hooks extending outwardly therefrom. Such hooks are generally provided with a shank portion secured to the lure, the shank portion having hook or barbed portions extending therefrom. The improvement comprises a holder having a body portion of generally rectangular and elongate shape, formed to be floatable, and having a pair of spaced, longitudinally extending grooves in one surface thereof. Extending inwardly from each side of the body portion are a plurality of spaced and parallel slots, generally perpendicular to the grooves, and alternately extending from opposite sides of the body portion. The slots extend completely through the thickness of the body portion, so as to receive the shanks of the fishing lure hooks in such manner that the barbed portions of the hooks are received in the longitudinal grooves. A cover member is hingedly secured to one end of the body portion to cover the grooves and slots, thereby retaining the hooks in place. Suitable latch means are provided to operate between the cover member and body portion and thus retain the cover member in closed position.

---

This invention relates to fishing lure holders, and more particularly to a fishing lure holder of the type adapted to receive and retain the hook portions of fishing lures.

A fisherman's tackle box is normally in a state of utter confusion and tangle, due primarily to the large number of fishing lures of all types, varieties, styles and sizes that a fisherman feels necessary to collect for meeting all possible fishing conditions. Generally speaking, fishing lures of the bait casting variety includes a body portion formed in any one of a myriad of shapes and sizes, and having means by which the lure is attached to the fishing line. One or more fishhooks are loosely mounted on the body portion, such fishhooks usually being of the treble hook type; that is, three hooks secured together at their shanks and the hook or barbed portions extending in equally spaced directions from the combined shanks. The loose mounting and the outward extension of the hook portions make it difficult for a plurality of lures to be disposed in one place without excessive tangling of the hooks, and a great deal of difficulty in separating one lure from the mass when it is to be used.

In addition, when a fisherman intends to take only a few of the fishing lures from his collection to the fishing site, it is difficult to transport such lures without a holder of some kind because of the danger in moving about with the sharpened hooks and the difficulty in arranging the few lures as to easily change from one to another on the fishing line.

In the past, fishing lure holders have been commercially manufactured, or hand made, to try to solve the problem of lure tangle. These devices have generally been made of some soft material, such as cork or soft wood, in any shape or form, and one or more of the hooks of the lure are embedded in the device when not in use. However, such devices have not been completely satisfactory for many reasons. For instance, the continual embedding of the sharpened hooks in the material leads to bending and dulling of the hook points and the obvious detriments therefrom in the fishing operation. Further, the constant embedding of the hooks soon destroys the holder. At the same time, such devices do not completely prevent tangling of the fishing lures, and result in unsightly and space consuming structures. Although easily manufactured or hand made, such devices are difficult to carry or store in a tackle box and provide no positive means of securing the fishing lure therein.

The device in which this invention is embodied comprises, generally, a fishing lure holder having an elongate body portion provided with longitudinally extending, spaced and parallel grooves formed in the upper surface thereof. Extending inwardly, or transversely, of the body portion and toward the longitudinal center thereof, are a plurality of slots disposed in parallel and spaced relation and extending alternately inwardly from opposite sides of the body portion. Each slot intersects one of the longitudinal grooves and the grooves are so located that when the shank portion of the fishing lure hook is disposed in one of the slots, the three barbed portions will be received in the longitudinal grooves on opposite sides of the center portion of the slot. A cover member is hingedly secured to one end of the body portion to extend over the grooves, slots and hooks, and latch means are provided to hold the cover member in closed position. The entire structure is made so as to float if dropped in the water, either by means of the material from which the device is made or by manufacturing the device in hollow form to provide an air pocket, and thus maintain the device above the surface.

A fishing lure holder so constructed and manufactured may be easily and economically produced and provides a means for orderly arrangement of fishing lures, either in a tackle box or when carried on the person of the fisherman, in a safe and efficient manner. Furthermore, such a device permits the lures to be mounted directly on the fishing line prior to removal from the holder, making the connection a much simpler and much safer operation. The device may be pleasantly and esthetically formed, and easily carried from place to place.

These and other advantages will become apparent from the following description, used to illustrate a preferred embodiment of the invention when taken with the accompanying drawings in which:

FIG. 1 is a perspective view of a fishing lure holder embodying the present invention, and showing the position of the various parts;

FIG. 2 is a plan view of the body portion of the fishing lure holder illustrated in FIG. 1 and showing fishing lure hooks mounted therein;

FIG. 3 is a transverse cross-sectional view of the device illustrated in FIGS. 1 and 2, taken substantially along the line 3—3 of FIG. 2 and looking in the direction of the arrows; and FIG. 4 is a partial longitudinal cross-sectional view of the device illustrated in FIGS. 1–3, taken substantially along the line 4—4 of FIG. 2 and looking in the direction of the arrows.

Referring more particularly to the drawings, where the showings are for the purpose of illustrating a preferred embodiment of the invention only, and not for the purpose of limiting same, the figures show the fishing lure holder, indicated generally by the numeral 10, so formed as to receive and retain a typical fishing lure, indicated generally by the numeral 12. Lure 12 has a treble hook, indicated generally by the numeral 14, secured to the body of the lure 12 by means of a ring 16. Hook 14 is shown to be of the treble hook variety, in which the shank portions 18 are secured together in any suitable manner and have extending therefrom barbed hook portions 20. An eye 22 at the base of the shank portions 18 receives the ring 16 for securement to the body of the lure 12.

With reference now to FIG. 2, the lure holder 10 is shown to include a generally elongate and rectangular body portion, indicated generally by the numeral 24, the body portion having end surfaces 26 and 28, and opposing side surfaces 30 and 32. Formed in a top surface 34 are a pair of spaced and parallel grooves 36 and 38 extending longitudinally of the body portion 24 and being of a sufficient depth, as will become hereinafter more apparent.

Formed through the body portion 24 and extending inwardly from the side surfaces 30 and 32 are a plurality of slots 40, the slots being in parallel spaced relation and alternately inwardly directed from opposite side walls 30 and 32. Each slot 40 intersects one of the grooves 36 or 38, depending on which side of the body portion 24 the slot is formed in.

As illustrated in FIG. 2, a treble hook 14 may be disposed within any of the slots 40 with the shank portion extending downwardly therefrom, as indicated in FIG. 3, and the barb or hook portions 20 conveniently received in the longitudinal grooves 36 and 38. By alternately disposing the slots 40 from opposite sides of the body portion 24, a maximum number of lures may be accommodated in the body portion, in the manner shown in FIG. 2.

Extending outwardly from one end of the body portion 24 is a flange 42 having opposed recesses, or dimples, 44 formed therein. At the opposite end of body portion 24, and on end wall 26, is a latch member 46, the purpose for which will become hereinafter more apparent. Latch member 46 may be secured to the end wall 26 in any suitable manner, or may be integrally formed as a part of the body portion 24.

Disposed above the top surface 34, and adapted to cover the grooves 36 and 38 and the slots 40, is a cover member, indicated generally by the numeral 48. Cover member 48 has a downwardly depending flange 49 having a slot 50 adapted to straddle the flange 42 on the body portion 35. Pins 52 retained in the flange 49 are received in the recesses 44 in the flange 42 to serve as a hinge assembly and permit the cover member 48 to be raised or lowered over the body portion 24.

Cover member 48 may be provided with an insert 54 of relatively resilient material so that upon closing the cover member 48 the arches of the hooks 20 will not interfere with the operation of the cover. As illustrated in FIG. 3, the insert material may be slightly compressed in the vicinity of the hook arches so that the cover may be completely closed.

At the opposite end of cover 48 is a latch member 56, receivable and retainable in the latch member 46 formed on the body portion 24. Thus, when the cover member is closed, the latch members 46 and 56 engage to maintain the cover member in such closed position.

It will now be apparent that when one or more fishing lures 12 are to be stored or transported, they may be disposed in the holder 10 by passing the shank 18 of the hook assembly 14 into one of the slots 40 in the body portion 24. The hooks 20 are received in the grooves 36 and 38, and protected from other such hooks, as well as from bending or dulling in the device. Upon closing and latching the cover member 48, the lures are safely and positively held in place in the holder and in a convenient, safe and efficient manner. It will be apparent that the location and size of the longitudinal grooves 36 and 38 and the slots 40 may be designed to accommodate hooks of different sizes. The entire lure holder may be made of a plastic material having sufficient properties to permit it to float, should it be dropped in the water, so as not to lose the lures therein along with the holder in the event of an accident. Alternatively, the body portion 24 may be formed to be hollow, thus creating an air pocket to provide buoyancy to the device. Additionally, the entire device may be made of wood or other suitable material, depending upon the desired esthetics of the structure.

Thus, a lure holder is provided which is extremely efficient and economical to manufacture and produce and which provides a positive and secure holding means for a plurality of fishing lures. By spacing the lures within the body portion, the lures are easily separated one from another, without the usual tangle of hooks and the like, and it will be apparent that a lure may be attached to a fishing line prior to removal from the holder for greater ease, convenience and safety.

The present invention has been described in connection with certain structural embodiments; however, it is to be appreciated that various changes may be made in the structural embodiments without departing from the intended spirit and scope of the present invention as defined by the appended claims.

Having thus described the invention, I claim:
1. A fishing lure holder comprising:
   a body portion having a pair of spaced and parallel grooves formed in one surface thereof and a plurality of spaced slots formed therein, said slots extending across one of said grooves;
   said grooves being spaced apart a sufficient distance to receive the barbed ends of a treble hook attached to a fishing lure when the shank portions of said hooks are disposed in said slots.
2. The fishing lure holder set forth in claim 1 and further including a cover member hingedly secured to said body portion and extending thereover to maintain said hooks in said grooves and in said slots.
3. The fishing lure holder set forth in claim 2 and further including latch means on said cover member and on said body portion, said latch means being cooperable to hold said cover member in closed position.
4. The fishing lure holder set forth in claim 1 wherein said slots extend centrally of said body portion and from opposite sides thereof and in alternate array to permit nesting of a plurality of hooks in said holder.
5. The fishing lure holder set forth in claim 1 wherein said holder is of a floatable material.
6. A fishing lure holder comprising:
   a generally elongate body portion formed of a floatable material;
   a pair of spaced and parallel grooves formed in one surface of said body portion and extending longitudinally thereof;
   a plurality of slots formed in said body portion and disposed in parallel spaced relation, said slots extending transversally of said body portion and alternately from opposite sides thereof, each of said slots intersecting one of said grooves;
   a cover member adapted to cover said one surface of said body portion;
   hinge means connecting said cover member to said body portion;
   and latch means on said cover member and engageable with said body portion to hold said cover member in hook retaining position over said body portion and said grooves and said slots.

7. A fishing lure holder comprising:
a body portion;
first means formed in said body portion and including spaced and parallel grooves extending generally longitudinally of said body portion for receiving the barbed ends of a hook attached to a fishing lure and received in said body portion;
and second means formed in said body portion and including a transverse slot extending toward the longitudinal center thereof and extending across one of said grooves, said second means receiving the shank portion of said hook attached to said fishing lure.

8. The fishing lure holder set forth in claim 7 wherein said second means further includes a plurality of spaced slots extending toward the center of said body portion and alternately from opposite sides of said body portion, each of said slots intersecting one of said grooves.

References Cited

UNITED STATES PATENTS

| | | | |
|---|---|---|---|
| 1,850,039 | 3/1932 | Townsend | 43—57.5 |
| 2,608,459 | 8/1952 | Malmquist | 43—57.5 X |
| 3,350,810 | 11/1967 | Warner et al. | 43—57.5 |

HUGH R. CHAMBLEE, Primary Examiner